(12) United States Patent
Nishiguchi

(10) Patent No.: US 7,195,408 B2
(45) Date of Patent: Mar. 27, 2007

(54) IMAGE FORMING SYSTEM ALLOWING FACILITATED PRINT SETTING FREE FROM ERRORS

(75) Inventor: Tomohiro Nishiguchi, Daito (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 10/840,631

(22) Filed: May 7, 2004

(65) Prior Publication Data

US 2005/0180793 A1  Aug. 18, 2005

(30) Foreign Application Priority Data

Feb. 13, 2004  (JP)  ............... 2004-037239

(51) Int. Cl.
*B41J 11/44* (2006.01)

(52) U.S. Cl. .......... 400/76; 400/70; 358/1.15; 358/1.9

(58) Field of Classification Search ........ 400/61, 400/70, 76; 358/1.13, 1.15, 1.9
See application file for complete search history.

(56) References Cited

U.S. PATENT DOCUMENTS

| | | | |
|---|---|---|---|
| 6,173,295 B1 * | 1/2001 | Goertz et al. ........ | 715/505 |
| 6,335,795 B1 * | 1/2002 | Neuhard et al. ........ | 358/1.15 |
| 2002/0097414 A1 * | 7/2002 | Utsunomiya .......... | 358/1.13 |
| 2002/0143924 A1 * | 10/2002 | Iga ................. | 709/223 |
| 2003/0063309 A1 * | 4/2003 | Parry ............... | 358/1.15 |
| 2003/0187939 A1 * | 10/2003 | O'Brien ............. | 709/206 |
| 2003/0233411 A1 * | 12/2003 | Parry et al. ......... | 709/206 |
| 2003/0233428 A1 * | 12/2003 | Spitzer et al. ........ | 709/220 |
| 2004/0184060 A1 * | 9/2004 | Nathan .............. | 358/1.13 |
| 2004/0196492 A1 * | 10/2004 | Johnson et al. ....... | 358/1.15 |

FOREIGN PATENT DOCUMENTS

| | | |
|---|---|---|
| JP | 09-037011 | 2/1997 |
| JP | 09-037011 A | 2/1997 |
| JP | 11-316658 | 11/1999 |
| JP | 2000069077 A * | 3/2000 |
| JP | 2001-142657 | 5/2001 |
| JP | 2001-282637 | 10/2001 |
| JP | 2002-236568 | 8/2002 |
| JP | 2003-076524 | 3/2003 |
| JP | 2003085097 A * | 3/2003 |
| JP | 2003-241922 | 8/2003 |
| JP | 2003-241922 A | 8/2003 |
| JP | 2003-280863 | 10/2003 |
| JP | 2003-280863 A | 10/2003 |
| JP | 2004342038 A * | 12/2004 |

* cited by examiner

*Primary Examiner*—Minh Chau
(74) *Attorney, Agent, or Firm*—Buchanan Ingersoll & Rooney PC

(57) ABSTRACT

In a printing system in which a user PC and a printer are connected to a network, when the user PC accesses the printer for print setting, the printer issues a job ticket containing print setting contents to the user PC in a form such as an e-mail. When print data and the job ticket are transmitted from the user PC to the printer, the printer analyzes the job ticket, and executes printing based on the analyzed contents. In this manner, a user can readily achieve a print setting free from errors.

17 Claims, 17 Drawing Sheets

FIG.11

```
PRINT SETTING

NUMBER
OF COPIES:       [        1 ]
PAPER SIZE:      [ Post Card ▼ ]
TWO-SIDED PRINTING: [ Off ▼ ]
PAPER FEED TRAY:   [ Tray 1 ▼ ]
PAPER OUTPUT TRAY: [ Tray 1 ▼ ]

PRINTING CANNOT BE EXECUTED WITH THIS SETTING.
PLEASE SET AGAIN.

[ ENTER ]  [ CANCEL ]
```

FIG.12

```
PRINT SETTING

NUMBER
OF COPIES:       [        1 ]
PAPER SIZE:      [ A4 ▼ ]
TWO-SIDED PRINTING: [ Off ▼ ]
PAPER FEED TRAY:   [ Tray 1 ▼ ]
PAPER OUTPUT TRAY: [ Tray 1 ▼ ]

YOUR PRINT EXECUTION ID IS [fkdsajrweoapr2fasdfsa21].

[ ENTER ]  [ CANCEL ]
```

FIG.13

[EXAMPLES OF PRINTER ABILITY ACQUIRED BY PRINTER ABILITY ACQUIRING PORTION]

| SPECIFIC EXAMPLE | REMARK |
| --- | --- |
| MAXIMUM NUMBER OF COPIES | HOW MANY COPIES OF RECEIVED PRINT DATA CAN BE PRINTED AT THE MAXIMUM |
| PAPER SIZE | PAPER SIZE AVAILABLE FOR PRINTING (A3, A4, B4 ...) |
| TWO-SIDED PRINTING | WHETHER TWO-SIDED PRINTING FUNCTION IS SUPPORTED OR NOT |
| STAPLING | WHETHER OR NOT THE PRINTED COPIES CAN BE STAPLED, A STAPLED POSITION |
| GROUPING | WHETHER OR NOT THE PRINTED COPIES CAN BE GROUPED |
| SORTING | WHETHER OR NOT THE PRINTED COPIES CAN BE SORTED |
| FOLDING | WHETHER OR NOT THE PRINTED COPIES CAN BE FOLDED, A MANNER OF FOLDING (HALF-FOLD, SADDLE STITCH, Z-FOLD, ETC.) |
| PAPER FEED TRAY | AVAILABLE PAPER FEED TRAY TYPE (TRAY 1, TRAY 2, ..., MANUAL PAPER FEED TRAY, LARGE VOLUME PAPER FEED TRAY) |
| PAPER OUTPUT TRAY | AVAILABLE PAPER OUTPUT TRAY TYPE (MAIN TRAY, SUB TRAY, ...) |
| PAPER OUTPUT MODE | WHAT KIND OF PAPER OUTPUT MODE IS SUPPORTED (Face-Down, Face-Up) |
| PAGE ORDER | WHICH PAGE ORDER IS SUPPORTED AS PAGE OUTPUT ORDER OF THE PRINTED COPIES (PAGE 1 TO N, PAGE N TO 1) |
| HOLE PUNCHING | WHETHER OR NOT THE PRINTED COPIES CAN BE PUNCHED, A MANNER OF HOLE PUNCHING (RIGHT, LEFT, UPPER PORTION, TWO HOLES, THREE HOLES, ...) |
| N-in-1 | WHETHER OR NOT N-in-1 PRINTING IS SUPPORTED, HOW MANY PAGES OF PRINT MATERIALS CAN BE PRINTED PER ONE FACE OF PAPER |
| BOOKLET MAKING PRINTING | WHETHER OR NOT BOOKLET MAKING PRINTING IS SUPPORTED, SUPPORTED PRINTING METHOD (LEFT SIDE OPENING, RIGHT SIDE OPENING) |
| PRINT POSITION | WHETHER OR NOT PRINT POSITION ADJUSTMENT IS SUPPORTED, AN ADJUSTMENT METHOD (TO THE RIGHT OR LEFT) |
| TANDEM PRINTING | WHETHER OR NOT TANDEM PRINTING IS SUPPORTED |

FIG.14

[EXAMPLES OF PRINT SETTING CONTENTS PROVIDED BY PRINT SETTING PORTION]

| SPECIFIC EXAMPLE | REMARK |
|---|---|
| NUMBER OF COPIES | DESIGNATION OF THE NUMBER OF COPIES |
| PAPER SIZE | DESIGNATION AS TO WHICH PAPER SIZE IS USED FOR PRINTING |
| TWO-SIDED PRINTING | DESIGNATION AS TO WHETHER TWO-SIDED PRINTING OR ONE-SIDE PRINTING IS PERFORMED |
| STAPLING | DESIGNATION AS TO WHETHER THE PRINTED COPIES ARE TO BE STAPLED, AND A STAPLED POSITION |
| GROUPING | DESIGNATION AS TO WHETHER OR NOT THE PRINTED COPIES ARE TO BE GROUPED |
| SORTING | DESIGNATION AS TO WHETHER OR NOT THE PRINTED COPIES ARE TO BE SORTED |
| FOLDING | DESIGNATION AS TO WHETHER OR NOT THE PRINTED COPIES ARE TO BE FOLDED, AND A MANNER OF FOLDING |
| PAPER FEED TRAY | DESIGNATION AS TO WHICH PAPER FEED TRAY IS TO BE USED |
| PAPER OUTPUT TRAY | DESIGNATION AS TO WHICH PAPER OUTPUT TRAY IS TO BE USED |
| PAPER OUTPUT MODE | DESIGNATION OF PAPER OUTPUT MODE |
| PAGE ORDER | DESIGNATION OF PAGE OUTPUT ORDER OF THE PRINTED COPIES |
| HOLE PUNCHING | WHETHER OR NOT THE PRINTED COPIES CAN BE PUNCHED. DESIGNATION OF A HOLE PUNCHING METHOD |
| N-in-1 | DESIGNATION AS TO WHETHER OR NOT N-in-1 PRINTING IS TO BE EXECUTED AND HOW MANY PAGES OF PRINT MATERIALS ARE TO BE PRINTED PER ONE FACE OF PAPER |
| BOOKLET MAKING PRINTING | DESIGNATION AS TO WHETHER OR NOT BOOKLET MAKING PRINTING IS TO BE EXECUTED AND WHICH BOOKLET MAKING PRINTING METHOD IS TO BE EMPLOYED |
| PRINT POSITION | DESIGNATION AS TO WHETHER OR NOT PRINT POSITION IS TO BE ADJUSTED AND WHAT KIND OF ADJUSTMENT METHOD IS TO BE EMPLOYED |
| TANDEM PRINTING | DESIGNATION AS TO WHETHER OR NOT TANDEM PRINTING IS EXECUTED |

FIG.16

```
TO: printer_a@hogehoge.com
SUBJECT: ask print setting
TEXT:
```

FIG.17

```
TO: user_a@hogehoge.com
SUBJECT: how to print setting
TEXT:
Copies=1(1-999)
Paper Size=1(1: A4, 2: Letter, 3: Post Card)
Duplex=1(1:Off, 2: On)
Input Tray=1 (1: Tray1, 2: Manual Feed)
Output Tray=1 (1: Tray1, 2: Tray2)
```

FIG.18

```
TO: printer_a@hogehoge.com
SUBJECT:
TEXT:
Copies=1
Paper Size=3
Duplex=1
Input Tray=1
Output Tray=1
```

FIG.19

```
TO: user_a@hogehoge.com
SUBJECT: Error Setting
TEXT:
Copies=1
Paper Size=3 ****
Duplex=1
Input Tray=1 ****
Output Tray=1

Print Setting Error.
Please setting again.
```

FIG.20

```
TO: user_a@hogehoge.com
SUBJECT: Job Ticket
TEXT:
Copies=1
Paper Size=3
Duplex=1
Input Tray=1
Output Tray=1

Your Ticket ID is [fsdajo3214fesalkj].
```

IMAGE FORMING SYSTEM ALLOWING FACILITATED PRINT SETTING FREE FROM ERRORS

This application is based on Japanese Patent Application No. 2004-37239 filed with the Japan Patent Office on Feb. 13, 2004, the entire content of which is hereby incorporated by reference.

BACKGROUND OF THE INVENTION

1. Field of the Invention

The present invention relates to a job ticket issuing apparatus, an image forming apparatus and an image forming system, and more particularly to a job ticket issuing apparatus, an image forming apparatus and an image forming system allowing facilitated print setting free from errors.

2. Description of the Related Art

Conventionally, an image forming apparatus forming an image on paper using toner, such as MFP (Multi Function Peripherals) or a printer, has been known. In such an image forming apparatus, a manner of printing such as the number of copies to be printed and a paper size should be set. The image forming apparatus executes printing based on a setting of the printing manner.

Among the conventional arts of the image forming apparatus, Japanese Laid-Open Patent Publication No. 11-316658 discloses a technique in which an image forming apparatus provides a manner of print setting to a user PC using HTTP (hypertext transfer protocol) and accepts the setting, so as to print out print data received with HTTP. The print setting is held in the image forming apparatus.

Japanese Laid-Open Patent Publication No. 2001-142657 discloses an image forming apparatus including a web server which holds print data and accepts a print setting command and a print execution command of the held print data.

Japanese Laid-Open Patent Publication No. 2002-236568 discloses a printing system in which a printing device has a mail address for each printing instruction and the printing instruction is determined by a mail address to which a print job is sent.

Japanese Laid-Open Patent Publication No. 2003-76524 discloses a system including a management server managing a plurality of devices on the network, in which a printer driver of a client PC outputting a print command acquires information on an output destination device list and available print setting thereof from the management server so that a user interface of the printer driver reflects such information.

With the technique disclosed in Japanese Laid-Open Patent Publication No. 11-316658, however, a protocol used for reception of the print data by the image forming apparatus is limited to HTTP. Accordingly, when the print data is transmitted from the client PC, HTTP should be used for upload without exception. In addition, since a value for the print setting is held in the image forming apparatus, the print job should be transmitted simultaneously with the setting.

With the technique described in Japanese Laid-Open Patent Publication No. 2001-142657, as the print data is held in the server, a storage area for that data is required.

In addition, with the technique described in Japanese Laid-Open Patent Publication No. 2002-236568, print instruction contents are determined by the mail address. Accordingly, it is disadvantageous in that a plurality of mail addresses should be prepared for one output device.

With the technique described in Japanese Laid-Open Patent Publication No. 2003-76524, the management server managing the plurality of devices is required.

Moreover, in a general conventional art, in order to complete detailed print setting in the image forming apparatus, a dedicated printer driver adapted to a type of the image forming apparatus should be installed in each client PC, which results in complicated procedure.

SUMMARY OF THE INVENTION

The present invention was made to solve the above-described problems. An object of the present invention is to provide a job ticket issuing apparatus, an image forming apparatus and an image forming system allowing facilitated print setting free from errors.

In order to achieve the above-described object, according to one aspect of the present invention, a job ticket issuing apparatus includes an accepting portion accepting a print setting from a user, and an issuing portion issuing a job ticket indicating contents of the print setting, based on the print setting. The job ticket is input to an image forming apparatus corresponding to the job ticket along with print data, so that the print data is processed in accordance with the contents contained in the job ticket.

According to another aspect of the present invention, an image forming apparatus includes the job ticket issuing apparatus described above, an input portion for input of the job ticket and the print data, and a print portion executing printing of the print data in accordance with the contents of the input job ticket.

According to yet another aspect of the present invention, an image forming system is implemented by the image forming apparatus and a user PC connected to the image forming apparatus via a network.

According to yet another aspect of the present invention, an image forming system is implemented by connection of a job ticket issuing apparatus, an image forming apparatus and a user PC. The job ticket issuing apparatus includes an accepting portion accepting a print setting from a user and an issuing portion issuing a job ticket indicating contents of the print setting, based on the print setting. The user PC includes a transmission portion transmitting print data to the image forming apparatus. The image forming apparatus includes an input portion for input of the job ticket and the print data, and a print portion executing printing of the print data in accordance with the contents of the input job ticket. The job ticket is input to the image forming apparatus corresponding to the job ticket along with the print data, so that the print data is processed in accordance with the contents contained in the job ticket.

With the job ticket issuing apparatus according to one aspect of the present invention, the job ticket indicating contents of the print setting based on the print setting accepted from the user is issued. The job ticket is input to the image forming apparatus corresponding to the job ticket along with the print data, so that the print data is processed in accordance with the contents contained in the job ticket. Accordingly, facilitated print setting free from errors can effectively be realized.

With the image forming apparatus according to another aspect of the present invention, the job ticket and the print data are input, and printing of the print data is executed in accordance with the contents of the input job ticket. Therefore, printing in accordance with the print setting free from errors can effectively be executed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 shows a specific example of a second setting screen displayed in step S219 in FIG. 7.

FIG. 12 shows a specific example of the job ticket received by user PC 301 in step S219 in FIG. 7.

FIG. 13 shows a specific example of printer ability acquired by a printer ability acquiring portion 202.

FIG. 14 shows a specific example of contents of print setting provided by a print setting providing portion 203.

FIG. 16 shows a specific example of contents of a setting manner inquiry mail transmitted in step S401 in FIG. 15.

FIG. 17 shows a specific example of contents of a setting manner containing mail transmitted in step S405 in FIG. 15.

FIG. 18 shows a specific example of contents of a print setting mail transmitted in step S409 in FIG. 15.

FIG. 19 shows a specific example of contents of a second setting manner containing mail transmitted in step S415 in FIG. 15.

FIG. 20 shows a specific example of the job ticket transmitted in step S415 in FIG. 15.

DESCRIPTION OF THE PREFERRED EMBODIMENTS

In the following, a printing system (or an image forming system) in embodiments of the present invention will be described with reference to the figures.

A printing system in the present embodiments includes an image forming apparatus having a job ticket issuing apparatus and a user PC. The image forming apparatus includes a print setting providing portion causing a user to complete print setting; a job ticket issuing portion issuing data indicating a printing manner (also referred to as a job ticket or a print instruction ticket) based on the print setting when the user completes print setting through the print setting providing portion; and a print executing portion outputting print data based on contents of an instruction of the printing manner contained in the job ticket when the job ticket and the print data are received from the user PC or the like.

With such a configuration, the image forming apparatus issues a job ticket. As the job ticket contains print setting contents, the image forming apparatus does not have to hold the print setting contents in a memory or the like. In addition, the user transmits the print data to the image forming apparatus along with the job ticket issued by the image forming apparatus, thereby obtaining desired print output. Note that the job ticket and the print data can be transmitted in HTTP or by a mail, without limited to HTTP.

According to the present embodiments, the print setting can be completed using a job ticket. Therefore, it is not necessary to install a printer driver dedicated for the image forming apparatus in the user PC. Moreover, it is not necessary to simultaneously complete print setting and print execution (transmission of print data).

First Embodiment

Figure 1:
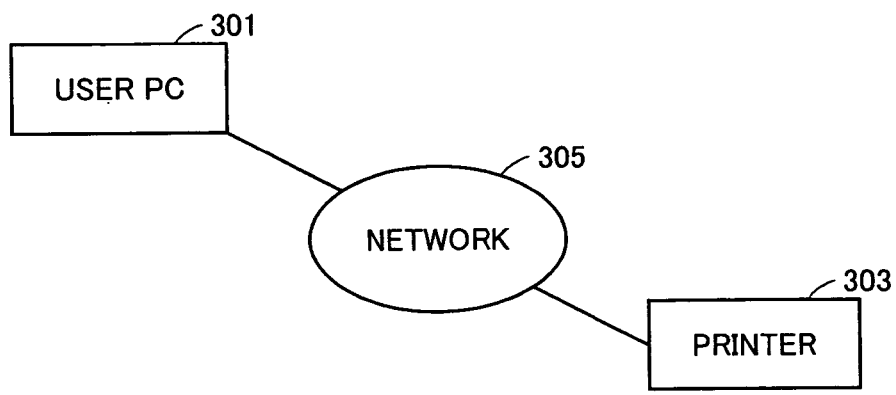
FIG. 1 illustrates a configuration of a printing system employing an image forming apparatus in a first embodiment of the present invention.

FIG. 1 illustrates a configuration of a printing-system employing an image forming apparatus in a first embodiment of the present invention.

Referring to FIG. 1, the printing system includes a user PC 301, a printer 303 representing an image forming apparatus, and a network 305 connecting user PC 301 and printer 303.

User PC 301 is a terminal including a processor to which the user transmits print data. Printer 303 includes a processor executing printing of the print data such as a document or image data.

Note that user PC 301 may be connected to a plurality of networks 305. User PC 301 is connected to network 305 as required and attains a function to complete print setting with a print setting providing function provided by printer 303. In addition, user PC 301 is connected to network 305 as required and attains a function to transmit the print data to printer 303.

A plurality of printers 303 may also be present. Printer 303 is permanently connected to network 305, and attains a function to set a printing manner, a function to issue a job ticket based on the printing manner set by the printing manner setting function, and a print execution function to print the print data in accordance with the print instruction contents contained in the job ticket when the job ticket and the print data are received.

Though network 305 is assumed as LAN in the present embodiment, the Internet, a leased circuit or the like may be employed. In the description below, an entire system including communication equipment constituting LAN is simply referred to as a network.

Figure 2:
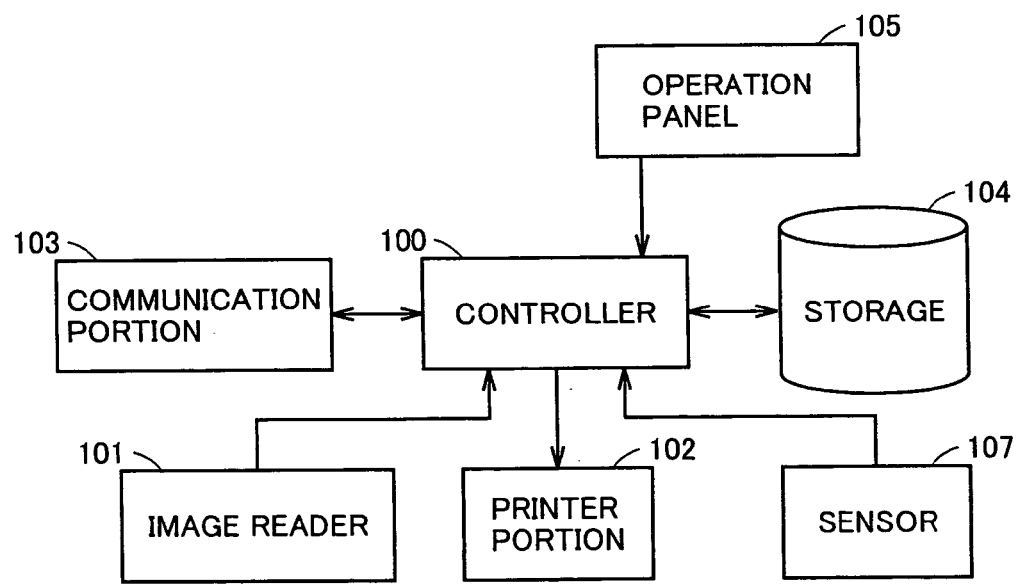
FIG. 2 is a functional block diagram showing an outline of functions of a printer 303 in FIG. 1.

FIG. 2 is a functional block diagram showing an outline of functions of printer 303 in FIG. 1.

Referring to FIG. 2, the printer includes a controller 100 controlling the entire printer, an image reader 101 reading image data from a material, a printer portion 102 printing an image on paper, a communication portion 103 connecting the printer to network 305, a storage 104 storing print data or the like, an operation panel 105 serving as an interface with the user, and a sensor 107 detecting a remaining amount of consumable supplies.

Though printer 303 includes image reader 101 in the present embodiment, this member is optional in printer 303.

Communication portion 103 serves as the interface for connecting the printer to network 305. Controller 100 receives the print data or the like from user PC 301. Controller 109 causes storage 104 to store the print data transmitted from user PC 301. Storage 104 may be a magnetic recording device such as a hard disk.

Image reader 101 irradiates the material with light, and the reflected light is received by CCD (Charge Coupled Device), so as to output image data to controller 100. Controller 100 subjects the image data to a prescribed image process such as noise elimination process and color conversion process and outputs data for printing to printer portion 102.

Printer portion 102 is controlled by controller 100, and forms an image on a recording medium such as paper in accordance with the print data stored in storage 104 or the data for printing generated from the image data output by image reader 101. Printer portion 102 forms a monochrome image (black, for example), or alternatively, it may form a color image. Operation panel 105 is arranged in an upper surface of the printer.

Figure 3:
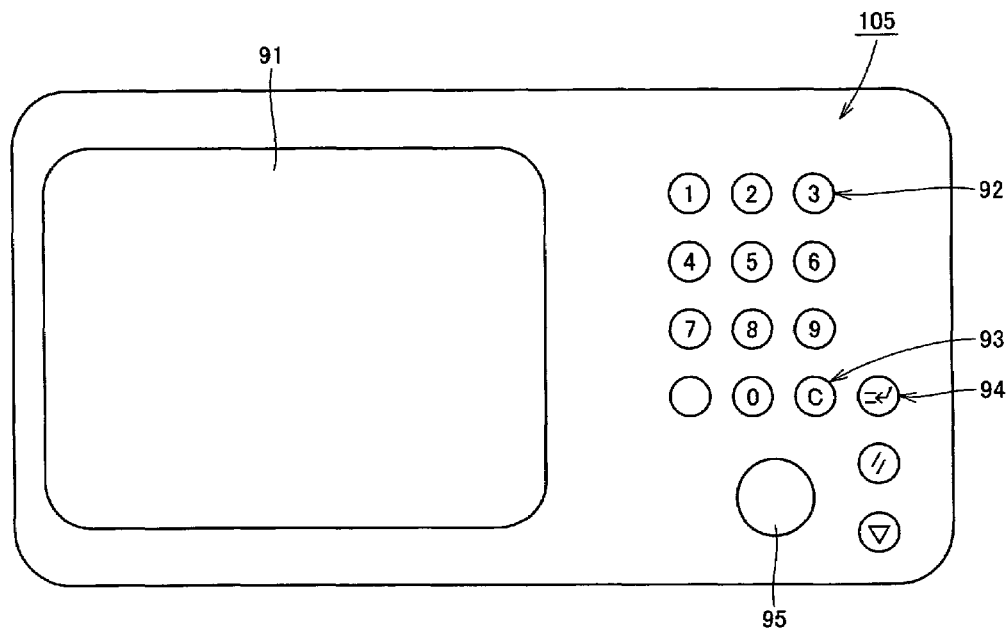
FIG. 3 is a plan view of an operation panel 105 provided in printer 303.

FIG. 3 is a plan view of operation panel 105 provided in printer 303.

Referring to FIG. 3, operation panel 105 includes a liquid crystal touch screen 91, a numeric keypad 92, a clear key 93 for resetting a numeric value that has been set to an initial value, an interrupt key 94 for interrupt copy, and a copy start key 95.

Liquid crystal touch screen 91 is constituted of a liquid crystal display device and a touch screen composed of a transparent member placed thereon. The touch screen serves as a coordinate input device. Operation panel 105, for example, displays buttons on the liquid crystal display device and detects an operation by the user pressing the button through the touch screen. In this manner, a variety of operation inputs are enabled without using switch buttons fixed to the input device.

Figure 4:
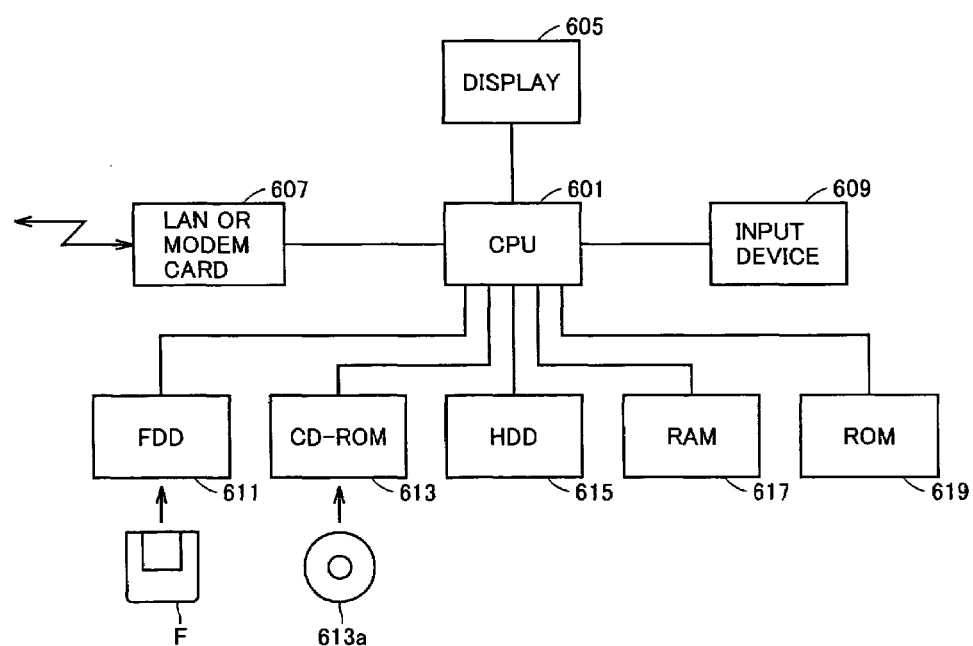
FIG. 4 is a block diagram showing a configuration of a user PC 301 in FIG. 1.

FIG. 4 is a block diagram showing a configuration of user PC 301 in FIG. 1.

Referring to FIG. 4, user PC 301 includes a CPU 601 for overall control of the apparatus, a display 605, an LAN (local area network) card 607 (or a modem card) for connection to the network or for communication with the outside, an input device 609 implemented by a keyboard or a mouse, a flexible disc drive 611, a CD-ROM drive 613, a hard disk drive 615, an RAM 617, and an ROM 619.

Data such as a program recorded on a flexible disc F can be read by means of flexible disc drive 611, while data such as a program recorded on a CD-ROM 613*a* can be read by means of CD-ROM drive 613.

Figure 5:
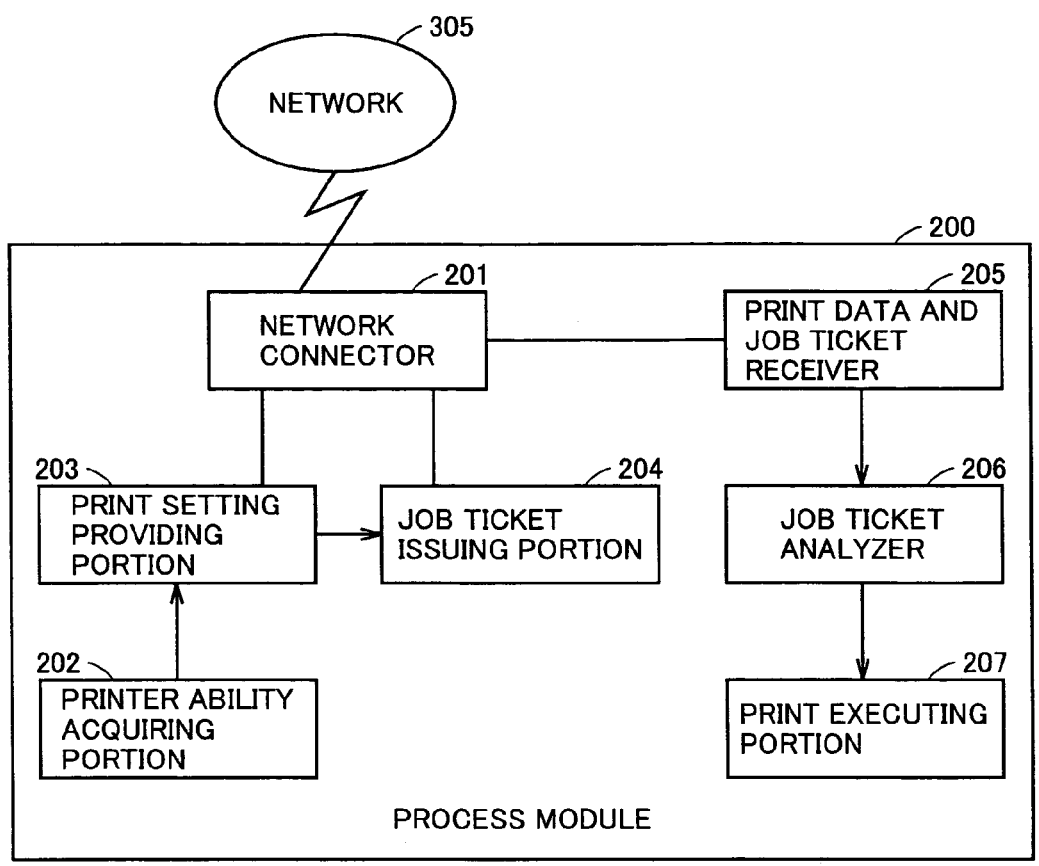
FIG. 5 illustrates a configuration of a process module that operates in printer 303 in FIG. 1.

FIG. 5 illustrates a configuration of a process module that operates in printer 303 in FIG. 1.

Referring to FIG. 5, a process module 200 is a module executed in printer 303. Process module 200 includes a network connector 201 for connection to network 305, a printer ability acquiring portion 202, a print setting providing portion 203, a job ticket issuing portion 204, a print data/job ticket receiver 205, a job ticket analyzer 206, and a print executing portion 207.

Network connector 201 establishes connection to the network as required. Printer ability acquiring portion 202 acquires a function (ability) attained by printer 303. Print setting providing portion 203 provides a display screen or a mail in order for user PC 301 to complete print setting.

Job ticket issuing portion 204 issues a job ticket based on the print setting that user PC 301 has completed with respect to print setting providing portion 203.

Print data/job ticket receiver 205 receives the print data and the job ticket transmitted from user PC 301.

Job ticket analyzer 206 analyzes the received job ticket. Print executing portion 207 prints the received print data based on an analysis result in job ticket analyzer 206.

Figure 6:
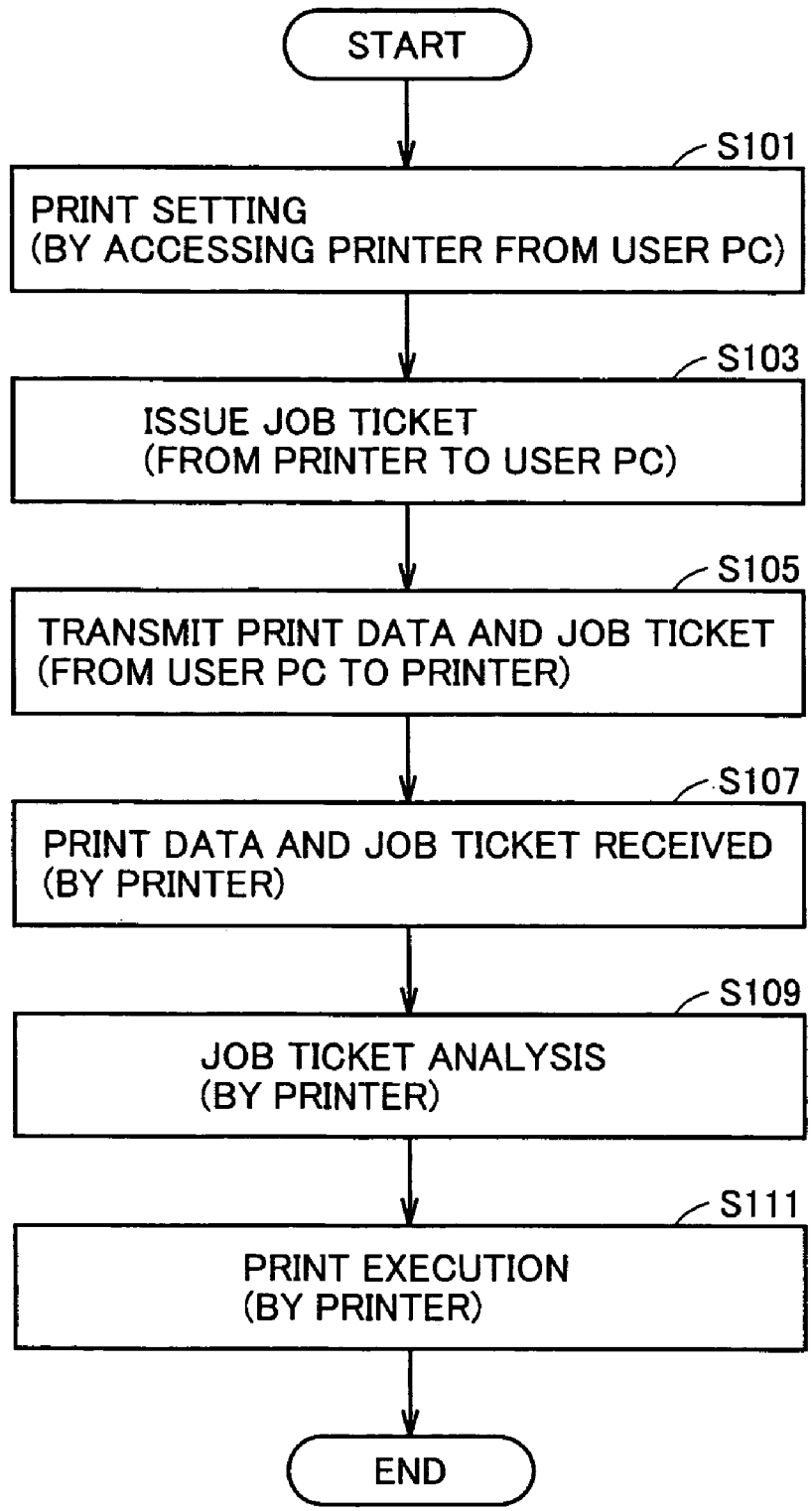
FIG. 6 is a flowchart illustrating a process executed in the printing system shown in FIG. 1.

FIG. 6 is a flowchart illustrating a process executed in the printing system shown in FIG. 1.

In step S101, user PC 301 accesses print setting providing portion 203 in printer 303 via network 305 for print setting. Print setting providing portion 203 prepares a setting screen based on an acquired result of printer ability by printer ability acquiring portion 202. Specifically, print setting providing portion 203 presents a setting screen presented on an HTTP server, a setting method using a command via Telnet connection, and a setting method by transmission of an e-mail, and accepts a setting from the user PC by HTTP, Telnet, an e-mail, and the like. In the present embodiment, print setting providing portion 203 causes display 605 of user PC 301 to display the setting screen, whereby the print setting is accepted therefrom.

Communication from user PC 301 to printer 303 does not necessarily have to be established via network 305. Alternatively, the user may complete print setting while viewing the display, through a display and input device such as operation panel 105 of printer 303, for example.

In addition, the print setting does not necessarily have to be completed by user PC 301 transmitting print data. Alternatively, the print setting may be completed by a user PC (another PC) that does not transmit print data.

In step S103, a job ticket is issued from printer 303 to user PC 301, based on the print setting contents set in step S101. Here, the job ticket contains a printing manner indicated by contents of the print setting. A possible data format may be a text file, a binary file, or a character string (such as ID).

As to reception of the job ticket by user PC 301, if the job ticket is in a form of a file, the job ticket may be received by user PC 301 using communication means such as HTTP or an e-mail. If the job ticket is in a form of the character string, the character string may be displayed on the display of user PC 301 or on the operation panel of printer 303 for visual inspection and note take by the user.

In step S105, user PC 301 transmits the print data and the job ticket obtained in step S103 to printer 303. The possible print data may be data in a format such as PCL, PS, PDF, TIFF, or JPEG.

Note that the print data may be prepared based on information contained in the job ticket obtained in step S103. For example, in a conventional printer driver, a setting that cannot be processed by printer 303 has been made in some cases. On the other hand, as the job ticket is issued by printer 303 here, a setting that cannot be processed will not be transmitted to printer 303 if the setting is completed based on the job ticket. In other words, whereas a process for prohibiting an erroneous setting achieved by the conventional printer driver has not been perfect in many cases, the job ticket issued by printer 303 contains a printing manner that does not violate a prohibited condition. Therefore, if the print data developed into a printer language in accordance with the contents contained in the job ticket is prepared in the printer driver, it is no longer necessary in the printer driver to determine whether or not a prohibited erroneous setting is present.

In addition, since the printer drive does not need to be aware of the printing manner that can be designated, it does not have to know an option attachment status or a model of a printer. Accordingly, a printer driver commonly used among all printer models can be fabricated.

Examples of means for transmitting the print data and the job ticket may include attaching the print data and the job ticket to a mail and transmitting the mail (if the job ticket is written with a character string, the character string is contained in mail text, for example), uploading with FTP or HTTP, and transmitting the print data and the job ticket in a format the same as in the conventional printer driver.

It is noted that the print data and the job ticket does not necessarily have to be transmitted via network 305. Alternatively, they may be carried to printer 303 by means of storage medium such as a memory card or a flexible disc.

In step S107 in FIG. 6, printer 303 receives the print data and the job ticket transmitted from user PC 301 in step S105.

In step S109, printer 303 analyzes the job ticket received in step S107. The job ticket contains the printing manner or the print setting. Such information is analyzed so that the printing manner or the print setting for the print data is specified.

In step S111, printer 303 executes printing of the print data based on the analysis result of the job ticket.

As described above, the printer according to the present embodiment issues data (job ticket) indicating the printing manner based on the print setting. In this manner, advantageously, the printer does not have to hold the contents of the print setting and reception of the print data does not have to be limited to reception with HTTP.

Figure 7:
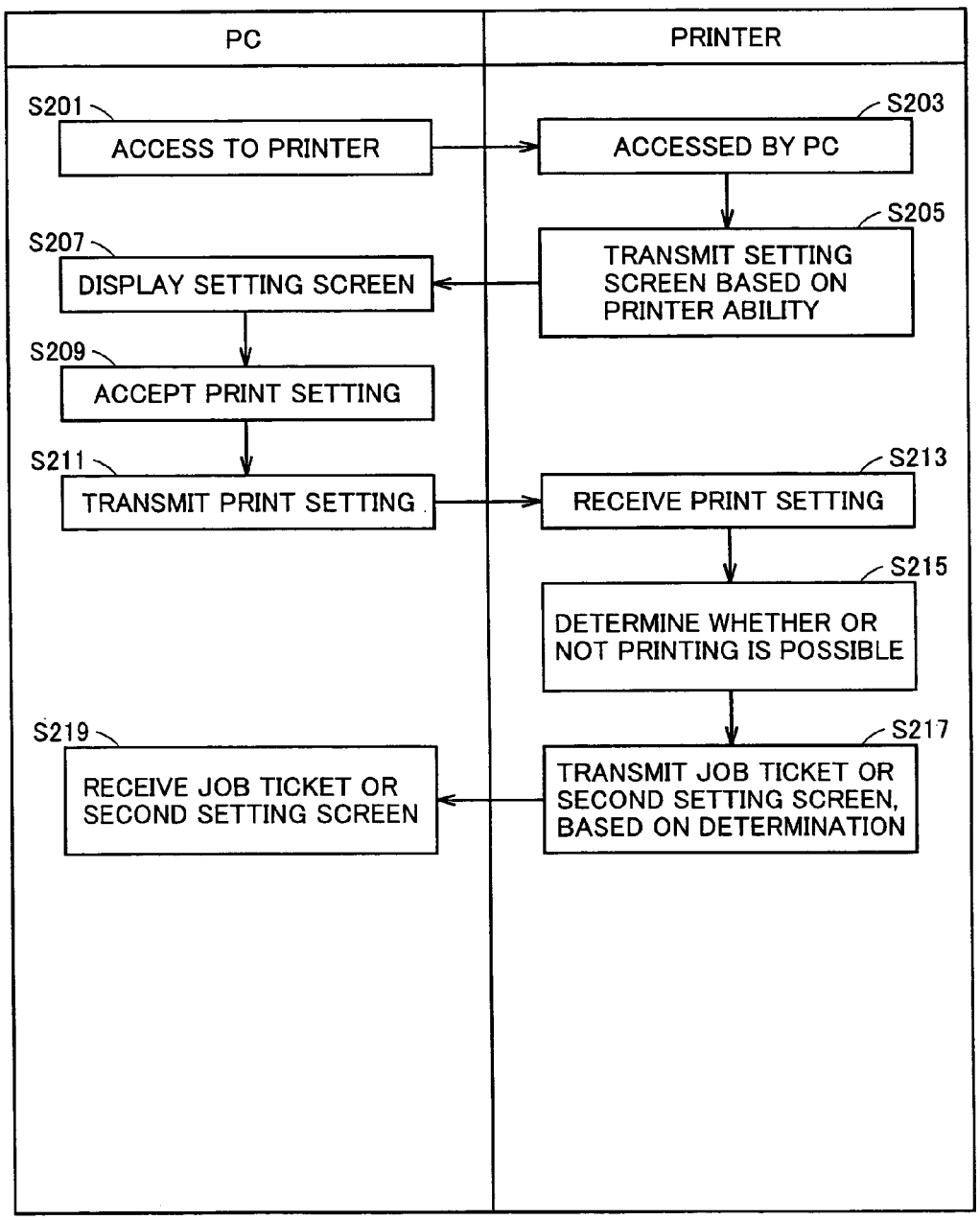
FIG. 7 is a flowchart illustrating a process until a job ticket is issued, executed between user PC 301 and printer 303 in the first embodiment.

FIG. 7 is a flowchart illustrating a process until the job ticket is issued, executed between user PC 301 and printer 303 in the present embodiment.

Referring to FIG. 7, user PC 301 uses a browser to access printer 303 in step S201, and printer 303 accepts the access from user PC 301 in step S203.

In step S205, printer 303 transmits a setting screen based on its ability to user PC 301 as a web page written in HTML. In response, in step S207, the setting screen (serving as GUI) is displayed on user PC 301. User PC 301 accepts the print setting from the user on the browser through the setting screen in step S209, and transmits the print setting to printer 303 in step S211.

If the printer receives the print setting in step S213, whether or not the printer setting is acceptable by printer 303 is determined in step S215.

In step S217, a second setting screen or the job ticket is transmitted to user PC 301 depending on determination.

In step S219, user PC 301 receives the second setting screen or the job ticket from printer 303. If the second setting screen is received, the process from step S207 is performed.

Figure 8:
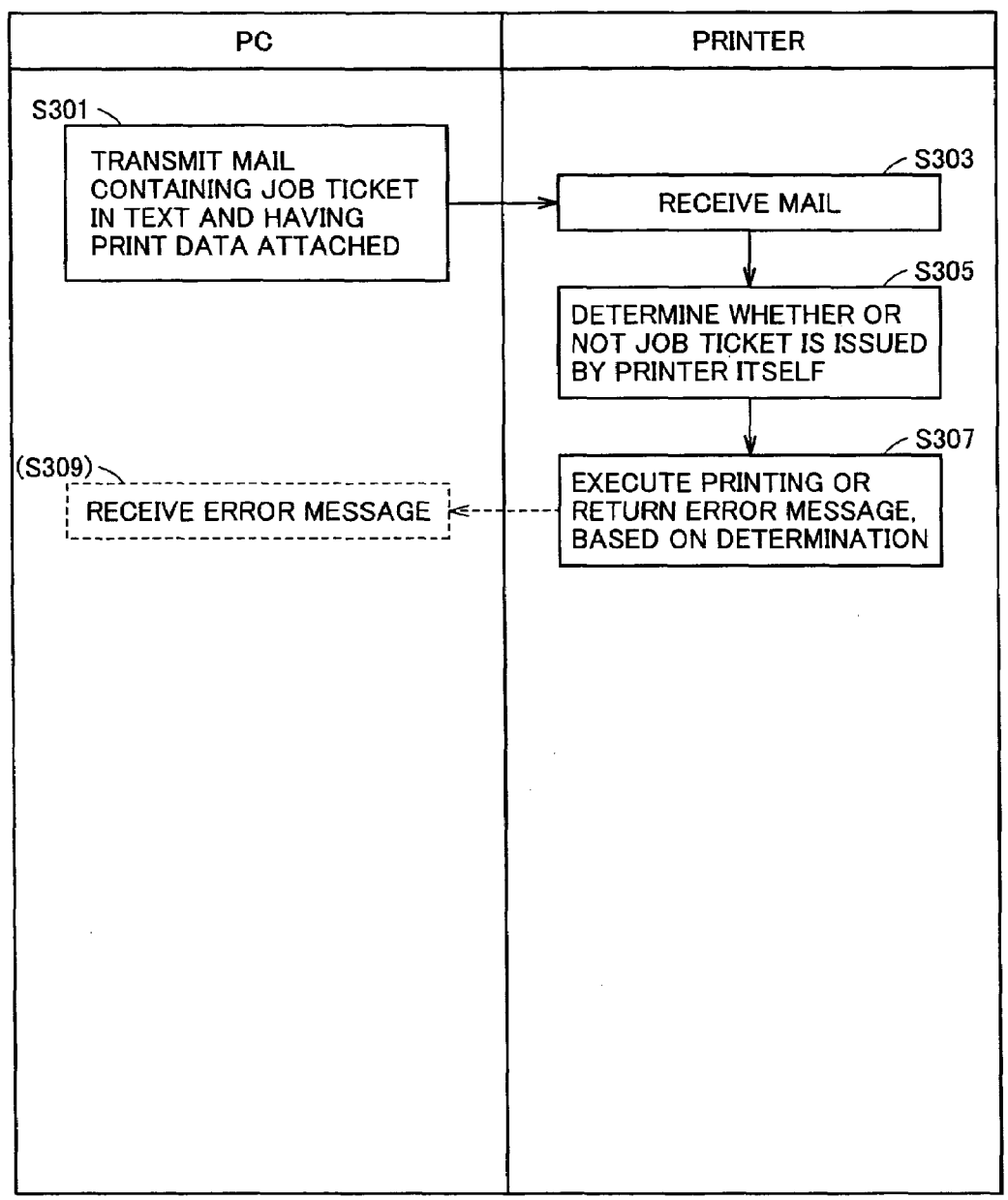
FIG. 8 is a flowchart illustrating a process in which user PC 301 receives a job ticket, attaches print data to the job ticket, and transmits the job ticket to printer 303.

FIG. 8 is a flowchart illustrating a process in which user PC 301 receives a job ticket, attaches print data thereto, and transmits the job ticket to printer 303 in the printing system in the present embodiment.

Referring to FIG. 8, in step S301, user PC 301 transmits a mail containing the job ticket in the text and having the print data attached as an attachment file to printer 303 by means of mail transmission software. If the printer receives the mail in step S303, whether or not it is the job ticket issued by the printer itself is determined in step S305.

In step S307, a process to print the print data based on the contents contained in the job ticket or a process to transmit an error message to user PC 301 is performed, based on determination.

When the error message is transmitted, user PC 301 receives that message in step S309.

Figure 9:
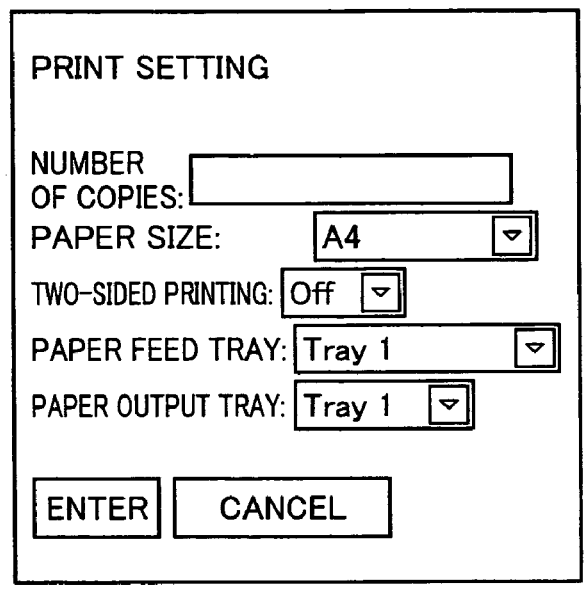
FIG. 9 shows a specific example of a setting screen displayed in step S207 in FIG. 7.

FIG. 9 shows a specific example of a setting screen displayed in step S207 in FIG. 7.

Referring to FIG. 9, in this example, the number of copies to be printed, a paper size, whether or not two-sided printing is performed, a paper feed tray to be used, and a paper output tray to be used can be set through the print setting screen.

Figure 10:
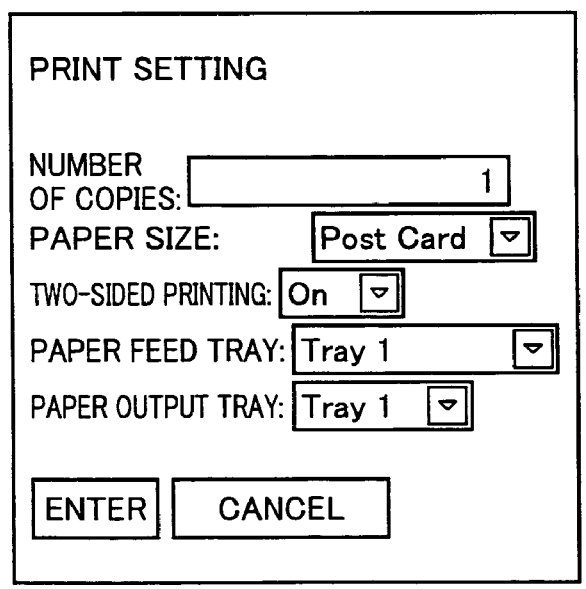
FIG. 10 shows a state after user's setting in the setting screen shown in FIG. 9.

FIG. 10 shows a state after user's setting in the setting screen shown in FIG. 9.

In this example, the number of copies is set to "1", the paper size is set to "Post Card", two-sided printing is turned "on", a paper feed tray is set to "Tray 1", and a paper output tray is set to "Tray 1".

FIG. 11 shows a specific example of a second setting screen displayed in step S219 in FIG. 7.

Referring to FIG. 11, in the second setting screen, a message saying that printing cannot be executed with this setting is displayed along with the contents set in the setting screen in FIG. 10.

FIG. 12 shows a specific example of the job ticket received by user PC 301 in step S219 in FIG. 7.

In the present embodiment, it is assumed that the job ticket is written as a print execution ID (character string) and the job ticket is shown as a part of the setting screen. The print execution ID refers to a character string uniquely derived from the print setting contents. The job ticket may contain identification information of the printer that issued the job ticket.

The user holds the character string of the job ticket shown on the browser by copying or taking note.

FIG. 13 shows a specific example of printer ability acquired by printer ability acquiring portion 202.

Referring to FIG. 13, examples of ability acquired by printer ability acquiring portion 202 include: the maximum number of copies printed by the printer; a paper size available for printing; whether or not two-sided printing is supported; whether or not the printed copies can be stapled and which portion of the copies can be stapled; whether or not the printed copies can be grouped; whether or not the printed copies can be sorted; whether or not the printed copies can be folded and an available manner of folding; an available paper feed tray type; an available paper output tray type; a supported paper output mode; supported page output order; whether or not the printed copies can be punched and a manner of hole punching; whether or not N-in-1 printing is supported and how many pages can be printed per one face of paper; whether or not booklet making printing is supported and a supported printing method; whether or not a print position can be adjusted and a supported adjustment method; and whether or not tandem printing can be executed.

Based on these acquired ability, the setting screen is transmitted from printer 303 to user PC 301 and displayed on user PC 301.

FIG. 14 shows a specific example of contents of the print setting provided by print setting providing portion 203.

Examples of accepted print setting include: the number of copies; the paper size; whether or not two-sided printing is performed; whether or not the printed copies are stapled and a stapled position; whether or not the printed copies are grouped; whether or not the printed copies are sorted; whether or not the printed copies are folded and a manner of folding; a paper feed tray to be used; a paper output tray to be used; a paper output mode; designation of page order; whether or not the printed copies are to be punched and a hole punching method; whether or not N-in-1 printing is to be performed and the number of pages per one face of paper; whether or not booklet making printing is performed and a booklet making printing method; whether or not a print position is adjusted and an adjustment method; and whether or not tandem printing is performed.

Solely some of these print settings may be accepted, or a setting other than these may be accepted.

Second Embodiment

As a printing system in a second embodiment is configured in a manner similar to that in the first embodiment, description thereof will not be repeated.

Though the setting screen has been displayed on user PC 301 for accepting a setting from the user in the first embodiment, alternatively, the print setting is accepted via an e-mail in the second embodiment.

Figure 15:
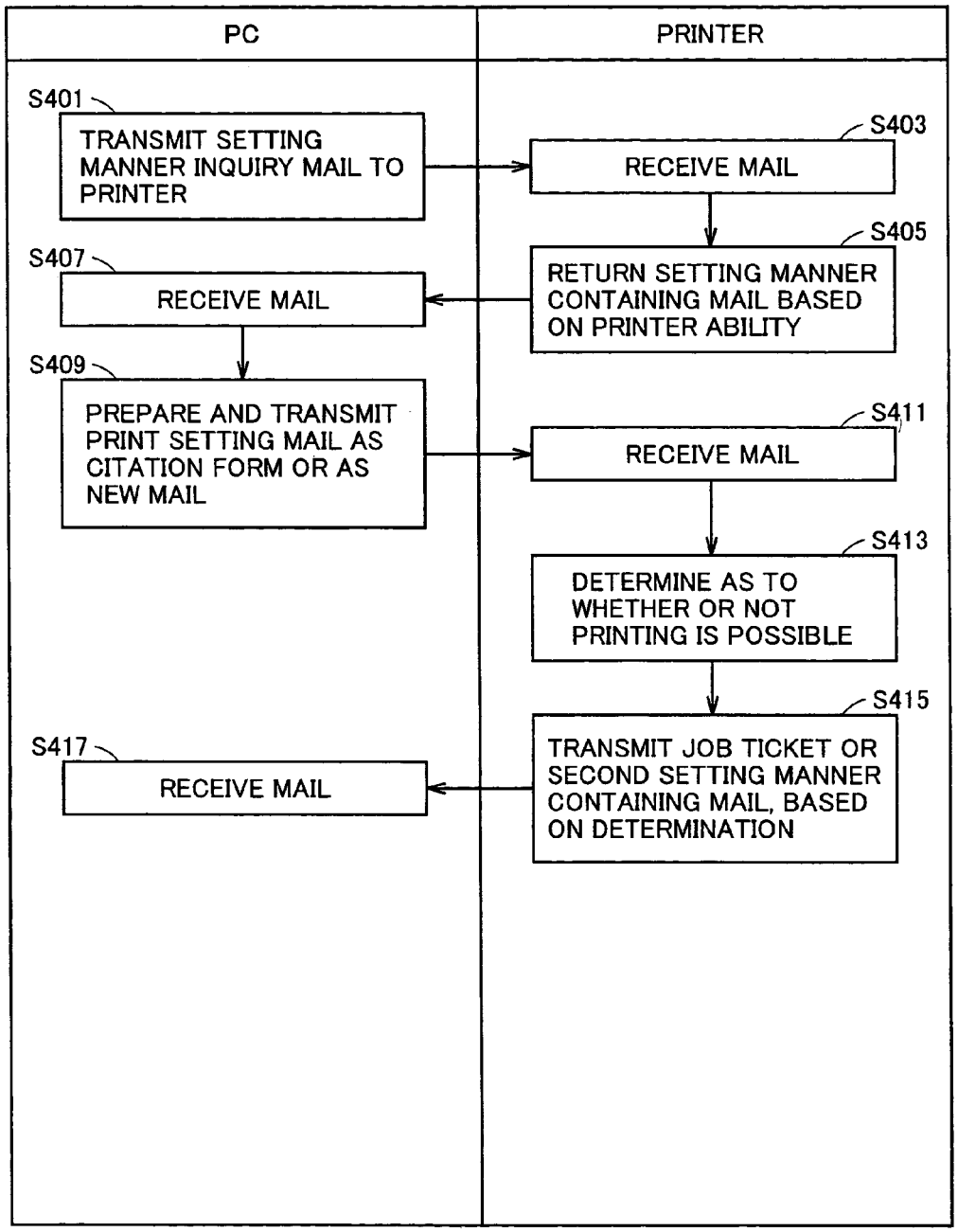
FIG. 15 is a flowchart illustrating a process executed between a user PC and a printer in a second embodiment.

FIG. 15 is a flowchart illustrating a process executed between a user PC and a printer in the second embodiment.

Referring to FIG. 15, if an inquiry mail of a print setting manner (setting manner inquiry mail) is transmitted from user PC 301 to printer 303 in step S401, printer 303 receives the inquiry mail in step, S403. In response to reception of the setting manner inquiry mail, a setting manner containing mail containing the print setting manner is prepared based on ability of the printer and the prepared mail is in turn transmitted to user PC 301 in step S405.

If user PC 301 receives the setting manner containing mail in step S407, the user prepares a print setting mail in a citation form or as a new mail and transmits the mail to printer 303 in step S409.

If printer 303 receives the print setting mail in step S411, whether or not the print setting contained in the mail can be accepted is determined in step S413.

In step S415, a second setting manner containing mail is transmitted to user PC 301 or the job ticket is transmitted to user PC 301, based on determination.

In step S417, the user PC receives the second setting manner containing mail or the job ticket.

FIG. 16 shows a specific example of contents of the setting manner inquiry mail transmitted in step S401 in FIG. 15.

Referring to FIG. 16, the mail destination is an address of the printer and the subject is a character string "ask print setting". Nothing is contained in the mail text.

FIG. 17 shows a specific example of contents of the setting manner containing mail transmitted in step S405 in FIG. 15.

Referring to FIG. 17, the mail destination is an address of user PC 301, and the mail text contains the number of copies that can be set, the available paper size, a setting for two-sided printing, a paper feed tray that can be set, and a paper output tray that can be set.

The user can check the contents that he/she is allowed to set by viewing the contents of the setting manner containing mail in FIG. 17.

FIG. 18 shows a specific example of contents of the print setting mail transmitted in step S409 in FIG. 15.

Referring to FIG. 18, the mail text contains the number of copies, the paper size, a setting for two-sided printing, and a setting of a paper feed tray and a paper output tray.

FIG. 19 shows a specific example of contents of the second setting manner containing mail transmitted in step S415 in FIG. 15.

Referring to FIG. 19, in the mail text, a mark "**" is given to an item that cannot be set in the printer among the contents set by the user in FIG. 18**, so as to warn the user.

The user can know a range that he/she cannot set by reading the second setting manner containing mail, and can transmit the setting manner containing mail again.

FIG. 20 shows a specific example of contents of the job ticket transmitted in step S415 in FIG. 15.

Referring to FIG. 20, the job ticket (ID in this case) is written in the end of the mail text.

Third Embodiment

As a printing system in a third embodiment is configured in a manner similar to that in the first embodiment, description thereof will not be repeated.

Figure 21:
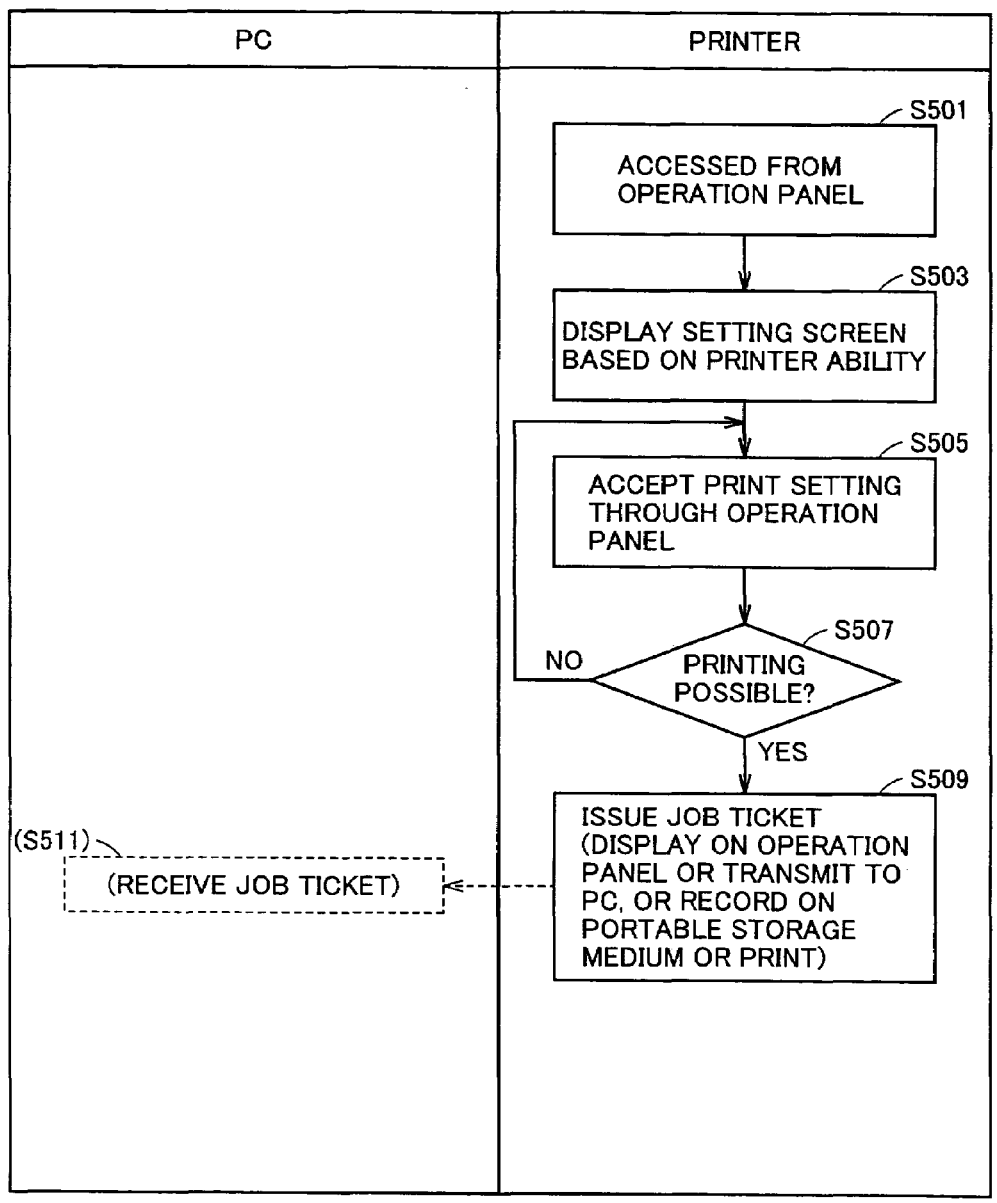
FIGS. 21 to 23 are flowcharts illustrating processes executed by printing systems in third to fifth embodiments of the present invention, respectively.

FIG. 21 is a flowchart illustrating a process executed by the printing system in the third embodiment of the present invention.

Referring to FIG. 21, when printer 303 accepts an access through operation panel 105 in step S501, a setting screen is displayed on operation panel 105 based on printer ability acquired by printer ability acquiring portion 202 in step S503. A print setting based on the setting screen is accepted from the user through operation panel 105 in step S505. Then, whether or not printing can be executed based on that setting is determined in step S507. If NO, the process returns to step S505, and if YES, printer 303 issues a job ticket in step S509.

Examples of a method of issuing the job ticket include: displaying a print execution ID as shown in FIG. 12 on operation panel 105 in order for the user to take note; transmitting the job ticket to the user PC; providing an interface for connection to a portable storage medium in printer 303 for recording the job ticket therein; or printing the job ticket on paper using printer portion 102.

When the job ticket is transmitted to user PC 301, user PC 301 receives the job ticket in step S511.

Fourth Embodiment

As a printing system in a fourth embodiment is configured in a manner similar to that in the first embodiment, description thereof will not be repeated.

In the method shown in FIG. 8, the mail containing the job ticket in the text and having the print data attached has been transmitted to printer 303 in step S301. In the fourth embodiment, alternatively, the job ticket is prepared as a data file and the mail having the job ticket and the print data attached is transmitted.

Figure 22:
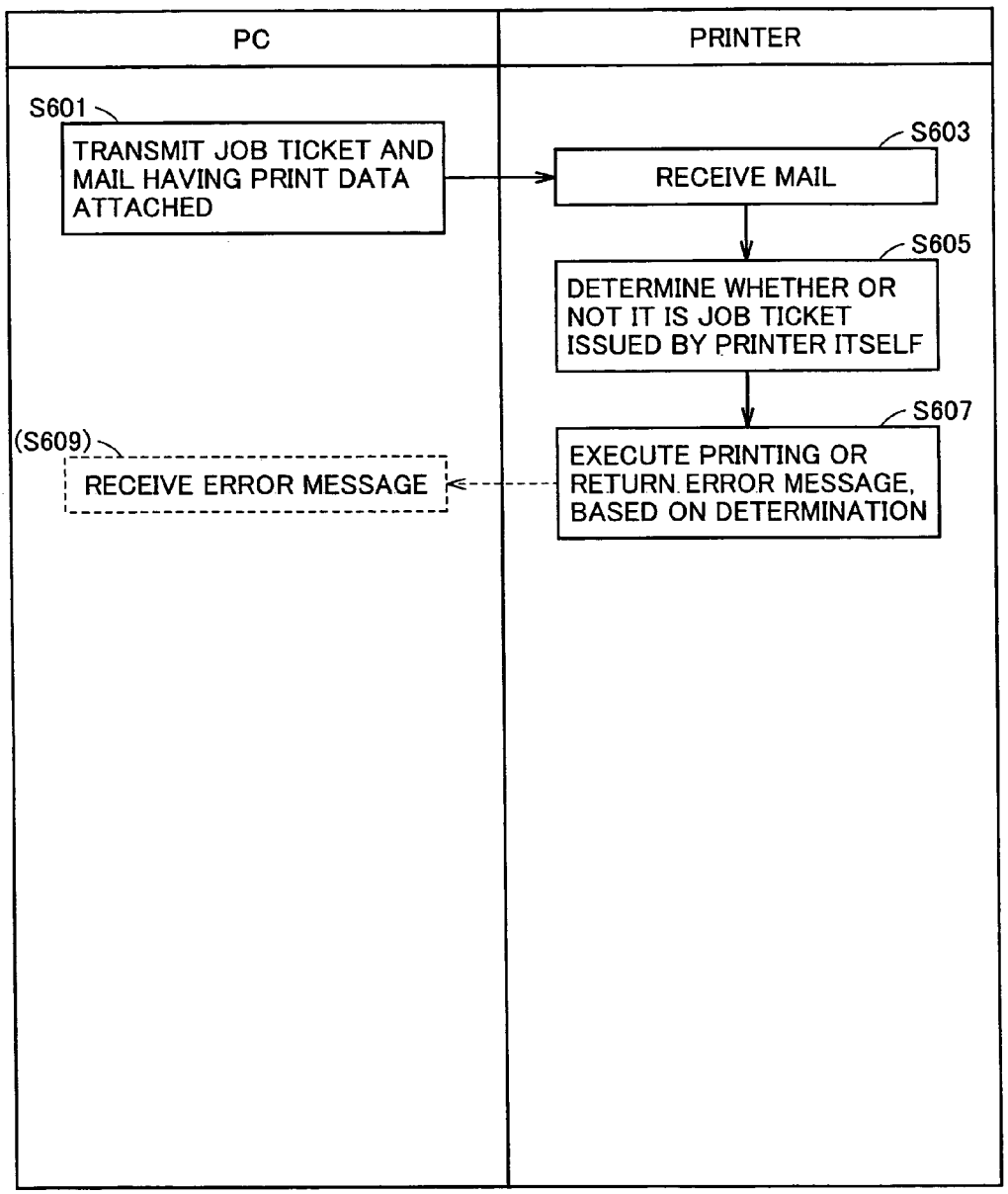

More specifically, in step S601 in FIG. 22, the mail having the job ticket and the print data attached is transmitted from user PC 301 to printer 303. As the process in printer 303 that received the mail (steps S603 to 609) is the same as the process in steps S303 to S309 in FIG. 8, description thereof will not be repeated.

Fifth Embodiment

As a printing system in a fifth embodiment is configured in a manner similar to that in the first embodiment, description thereof will not be repeated.

Figure 23:
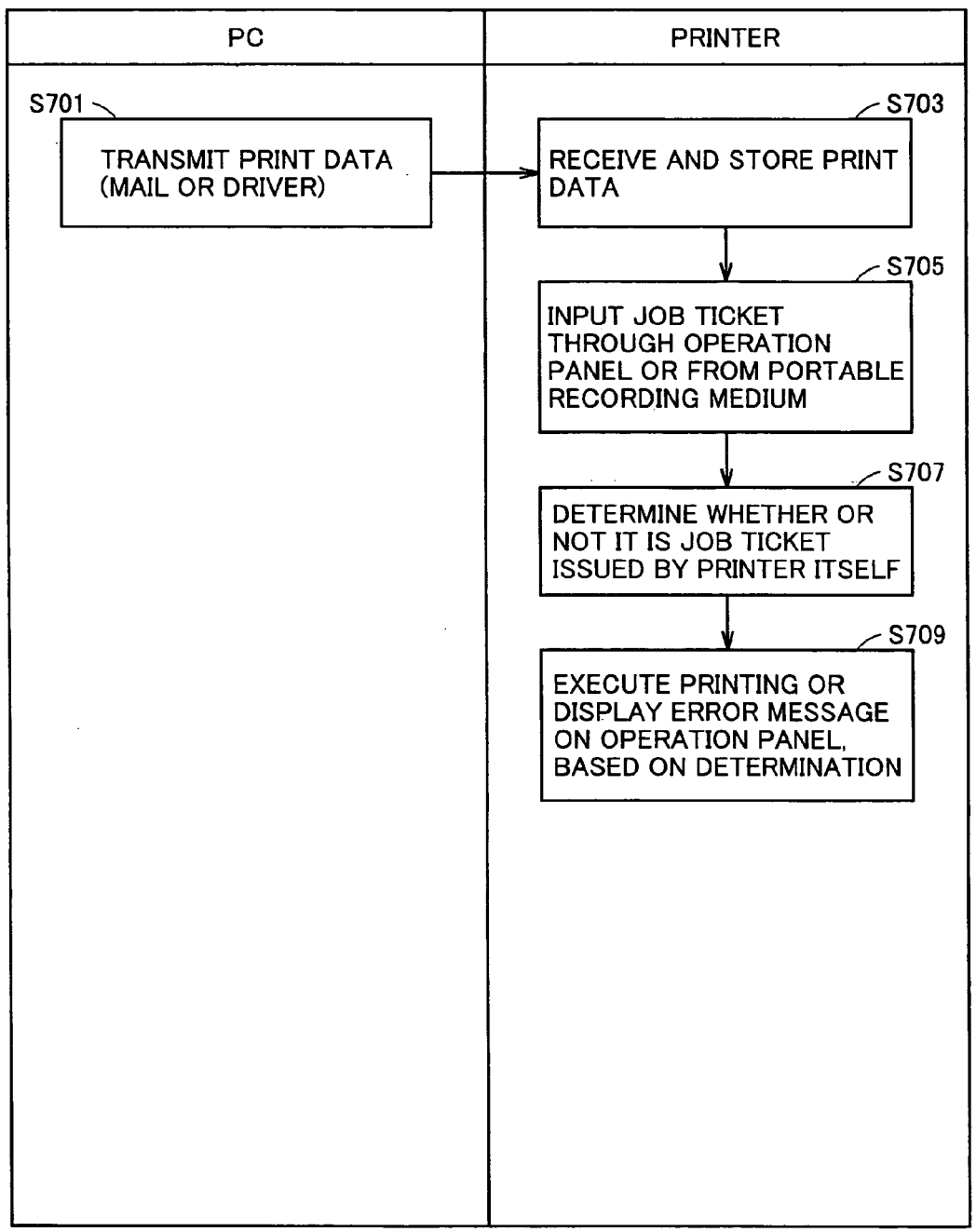

FIG. 23 is a flowchart illustrating a process executed by the printing system in the fifth embodiment of the present invention.

In the example shown in FIG. 8, the job ticket has been transmitted from user PC 301 to printer 303 via an e-mail. In the present embodiment, however, only the print data is transmitted via the e-mail or the like, while the job ticket is input through operation panel 105 of the printer. Printing of the print data in accordance with the job ticket is thus performed.

More specifically, referring to FIG. 23, the print data is transmitted from user PC 301 to printer 303 by means of data transfer software such as an e-mail or a printer driver in step S701.

If printer 303 receives the print data in step S703, printer 303 temporarily stores the print data in storage 104.

If the job ticket is input from the user through operation panel 105 or the job ticket is input through a not-shown interface using a portable recording medium in step S705, the printer determines whether or not that job ticket is the job ticket that the printer itself issued in step S707.

If that job ticket is determined as the job ticket that the printer itself issued in step S709, the job ticket is analyzed and printing is executed. If it is not the job ticket that the printer itself issued, an error message is displayed on operation panel 105.

In order to achieve the method shown in FIG. 23, it is necessary to identify whether or not the print data stored in the printer and the input job ticket belong to the same user. Therefore, a user ID or the like may be contained in both of the print data and the job ticket, so as to associate the print data with the job ticket. Alternatively, the job ticket may contain an identifier of the print data corresponding to the job ticket.

Sixth Embodiment

Figure 24:
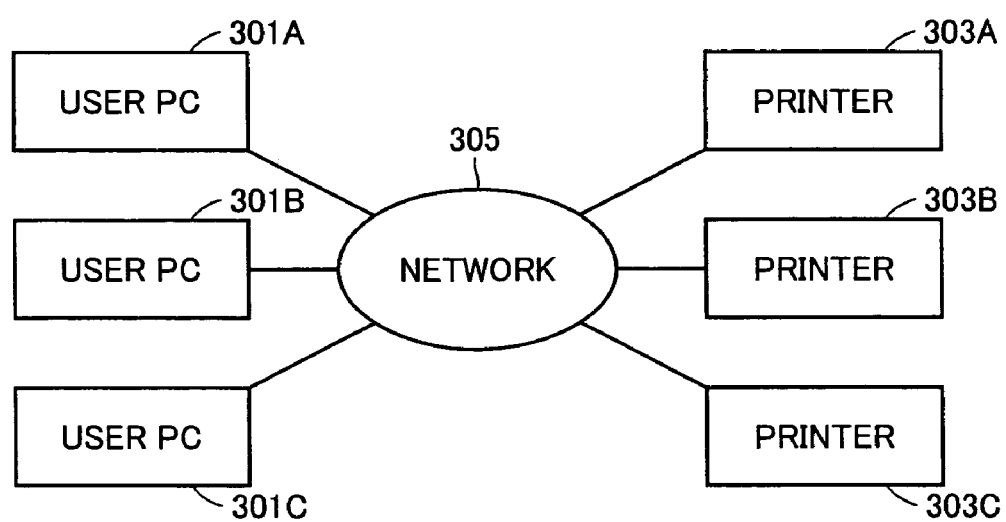
FIG. 24 illustrates a configuration of a printing system in a sixth embodiments of the present invention.

FIG. 24 illustrates a configuration of a printing system, in the sixth embodiment of the present invention.

In the present embodiment, an environment in which a plurality of user PCs 301A to 301C and a plurality of printers 303A to 303C are connected to network 305 is assumed.

For example, it is assumed that the job ticket issued by printer 303A can be used only for printer 303A. In other words, the job ticket issued by printer 303A is based on the ability of printer 303A, and malfunction may occur if the job ticket is used for other printers 303B and 303C. Therefore, the job ticket issued by printer 303A is assumed as inapplicable to other printers.

In order to attain such a function, for example, the job ticket issued by printer 303A is forced to contain an identifier (MAC address, IP address, etc.) of the printer itself (printer 303A). Printer 303A checks whether or not the job ticket contains its identifier upon receiving the job ticket, and executes printing only when the identifier is contained.

The system may otherwise be configured such that printing is executed only when the job ticket received by the printer contains user information for authorizing print execution, or may be configured such that printing is executed only when printing in a manner exactly as instructed by a print command contained in the job ticket can be executed.

Though the job ticket has been issued by the image forming apparatus in the embodiments described above, other apparatus such as a server that knows the ability of the image forming apparatus may accept the print setting and issue the job ticket.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A job ticket issuing apparatus, comprising:
   an accepting portion accepting a print setting from a user; and
   an issuing portion transmitting a job ticket to a user, the job ticket containing contents of the print setting, based on said print setting; wherein
   said job ticket is input to an image forming apparatus corresponding to the job ticket along with print data, so that said print data is processed by said image forming apparatus in accordance with the contents of said print setting contained in said job ticket.

2. The job ticket issuing apparatus according to claim 1, wherein
   said accepting portion includes a display portion displaying a setting screen on a user PC, the user PC is connected to a network and accepts a print setting from a user by said setting screen.

3. The job ticket issuing apparatus according to claim 2, wherein
   said setting screen is displayed based on ability of said image forming apparatus.

4. The job ticket issuing apparatus according to claim 1, wherein
   said accepting portion accepts the print setting via an e-mail from a user PC connected to the network, and
   said issuing portion transmits the job ticket to said user PC via an e-mail.

5. The job ticket issuing apparatus according to claim 4, transmitting a mail containing a setting manner in accordance with the ability of said image forming apparatus to said user PC, in response to an inquiry from the user via an e-mail.

6. The job ticket issuing apparatus according to claim 1, further comprising a determination portion determining whether or not said print setting accepted by said accepting portion adapts to said image forming apparatus, wherein
   said issuing portion issues said job ticket when said determination portion determines that the print setting adapts to said image forming apparatus.

7. An image forming apparatus, comprising:
   the job ticket issuing apparatus according to claim 1;
   an input portion for input of said job ticket and said print data; and
   a print portion executing printing of said print data in accordance with the contents of said input job ticket.

8. An image forming system, implemented by the image forming apparatus according to claim 7 and a user PC connected to said image forming apparatus via a network.

9. An image forming system implemented by connection of a job ticket issuing apparatus, an image forming apparatus and a user PC, wherein
   said job ticket issuing apparatus includes;
     an accepting portion accepting a print setting from the user PC, and
     an issuing portion issuing a job ticket to the user PC, the job ticket containing contents of the print setting, based on said print setting,
   said user PC includes a transmission portion transmitting print data to said image forming apparatus,
   said image forming apparatus includes;
     an input portion for input of said job ticket and said print data, and
     a print portion executing printing of said print data in accordance with the contents of said input job ticket, and said job ticket is input to said image forming apparatus corresponding to the job ticket along with said print data, so that said print data is processed by said image forming apparatus in accordance with the contents of said print setting contained in said job ticket.

10. A job ticket issuing program product, causing a computer to execute the steps of:

accepting a print setting from a user; and issuing a job ticket containing contents of the print setting based on said print setting to the user; wherein said job ticket is input to an image forming apparatus corresponding to the job ticket along with print data, so that said print data is processed by said image forming apparatus in accordance with the contents of said print setting contained in said job ticket.

11. The job ticket issuing program product according to claim 10, wherein said step of accepting includes the step of displaying a setting screen on a user PC connected to a network, so that a setting from a user is accepted in accordance with said setting screen.

12. The job ticket issuing program product according to claim 11, wherein said setting screen is displayed based on ability of said image forming apparatus.

13. The job ticket issuing program product according to claim 10, wherein in said step of accepting, the print setting is accepted via an e-mail from a user PC connected to a network, and in said step of issuing, the job ticket is transmitted to said user PC via an e-mail.

14. The job ticket issuing program product according to claim 13, transmitting a mail containing a setting manner in accordance with the ability of said image forming apparatus to said user PC, in response to an inquiry from the user via an e-mail.

15. The job ticket issuing program product according to claim 10, further comprising the step of determining whether or not said print setting accepted in said step of accepting adapts to said image forming apparatus, wherein in said step of issuing, said job ticket is issued when it is determined in said step of determining that the print setting adapts to said image forming apparatus.

16. A computer readable recording medium, comprising the job ticket issuing program product according to claim 10.

17. A method for connecting a job ticket issuing apparatus, an image forming apparatus, and a user PC, comprising:

accepting a print setting from a user PC with an accepting portion of the job ticket issuing apparatus;

issuing a job ticket with an issuing portion of the job ticket issuing apparatus, the job ticket containing contents of the print setting, based on the print setting;

transmitting print data to the image forming apparatus with a transmission portion of the user PC;

inputting the job ticket and the print data to an input portion of the image forming apparatus, executing printing of the print data in accordance with the contents of the input job ticket with a print portion of the image forming apparatus; and inputting the job ticket to the image forming apparatus corresponding to the job ticket along with the print data, so that the print data is processed by said image forming apparatus in accordance with the contents of said print setting contained in the job ticket.

\* \* \* \* \*